No. 666,752. Patented Jan. 29, 1901.
A. J. GUSTAVESON.
VULCANIZING TONGS.
(Application filed Sept. 13, 1900.)
(No Model.)

WITNESSES:

INVENTOR
Albert J. Gustaveson
By G. W. Bullard
ATTORNEY.

UNITED STATES PATENT OFFICE.

ALBERT J. GUSTAVESON, OF TACOMA, WASHINGTON.

VULCANIZING-TONGS.

SPECIFICATION forming part of Letters Patent No. 666,752, dated January 29, 1901.

Application filed September 13, 1900. Serial No. 29,933. (No model.)

*To all whom it may concern:*

Be it known that I, ALBERT J. GUSTAVESON, a citizen of the United States, residing at the city of Tacoma, in the county of Pierce and State of Washington, (and whose post-office address is 506 Berlin Building, in the said city of Tacoma,) have invented certain new and useful Improvements in Vulcanizing-Tongs, of which the following is a specification.

My invention relates to devices for the mending of articles of rubber.

It has for its objects, first, the vulcanizing of rubber for dentists' use; second, for the repairing of rubber goods, and, third, to provide a more simple and effective means for working with rubber than is now known or used. I attain these objects by means of the device illustrated in the accompanying drawings, in which—

Figure 1:
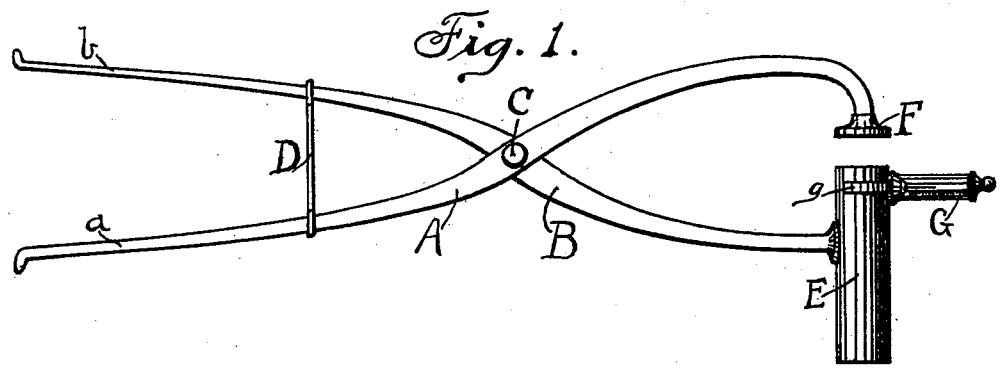
Figure 2:
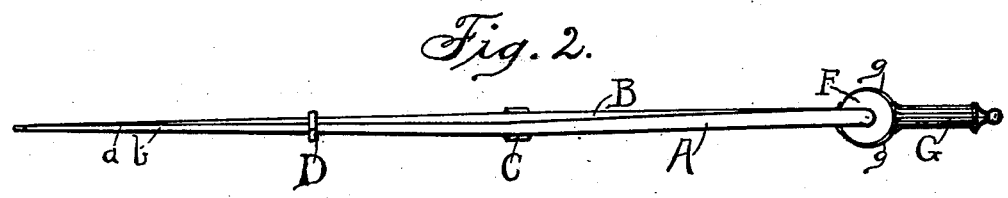
Figure 3:
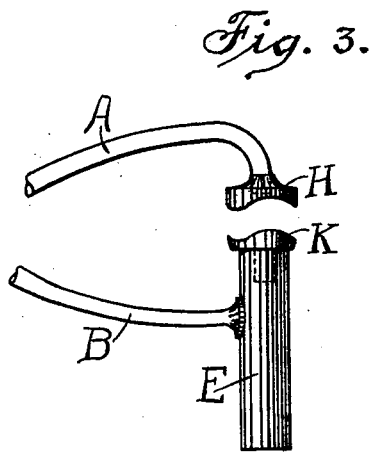

Figure 1 is a side view of my invention, and Fig. 2 is a top or edgewise view of the same. Fig. 3 is a partial view of my invention, illustrating one of a multiple of forms that I may use in the dies hereinafter described.

Similar letters refer to similar parts in the several views.

My invention comprises two tong-arms A and B, pivoted together at C. These arms taper into properly-shaped handles $a$ and $b$ and are provided with a sliding tension-clamp D. The opposite end of the tongs is provided with a heat-transmitting bar E, preferably round on one arm, and on the other arm a footpiece F to fit to the end of the heat-transmitting bar E when the tongs are closed. An adjustable thermometer G, having spring-arms $g\ g$ embracing the heat-transmitting bar E, completes the device.

In using my invention the article to be vulcanized is placed between the heat-transmitting bar E and footpiece F and the tongs clamped thereto. The heat-transmitting bar E is then placed in the flame of a lamp or suitable burner and allowed to be heated till the rubber is vulcanized to the desired degree of hardness. The thermometer G indicates the temperature of the heat-transmitting bar E, and thus enables the operator to obtain the results desired. My invention used in this way is a useful device not only in vulcanizing rubber articles for dentists' use, but is also useful in mending rubber boots, shoes, and other articles, and thus becomes a useful article to cobblers and other artisans who work in rubber.

In order to provide a means for vulcanizing articles of different forms, I make the tongs so that a set of dies of any desired form, as shown by H and K in Fig. 3, can be used. The tongs are made so that these dies can be taken off or put on readily, and a multiple of pairs of dies, each pair of a form different from the others, may be provided and used with each pair of tongs. My invention thus made and used is a device that is both new and useful.

I do not limit myself to any dimensions or proportions in the construction of my invention, but reserve the right to make the tongs of such form and proportions found most suitable to the purposes for which it is to be used.

Having described my invention, what I claim as new, and desire to secure by Letters Patent, is—

1. In vulcanizing-tongs, the combination of a pair of arms pivoted together, one arm having a heat-transmitting bar mounted thereon, and the other arm provided with a footpiece to fit the end of said heat-transmitting bar, and means for clamping said arms in a closed position, substantially as described.

2. In vulcanizing-tongs, the combination of a pair of arms pivoted together, one arm having a heat-transmitting bar mounted thereon, and a thermometer attached thereto, and the other arm provided with a footpiece to fit the end of said heat-transmitting bar, and means for clamping said arms in a closed position, substantially as described.

3. In vulcanizing-tongs, the combination of a pair of arms pivoted together, one arm having a heat-transmitting bar mounted thereon, an adjustable thermometer with spring-arms embracing said heat-transmitting bar to indicate the temperature thereof, the other arm being provided with a footpiece to fit the end of said heat-transmitting bar, a pair of dies to be mounted one on said heat-transmitting bar and the other on said footpiece, and means for clamping said arms in a closed position, substantially as described.

In testimony whereof I affix my signature in the presence of two witnesses.

ALBERT J. GUSTAVESON.

Witnesses:
G. W. BULLARD,
JNO. D. FLETCHER.